United States Patent [19]
Takahara et al.

[11] Patent Number: 6,009,365
[45] Date of Patent: Dec. 28, 1999

[54] VEHICLE DRIVE SYSTEM CONTROLLER AND CONTROL METHOD

[75] Inventors: Hideaki Takahara, Zama; Keiju Abo, Yokohama; Shojiro Kuroda, Sagamihara, all of Japan

[73] Assignee: Nissan Motor Co., Ltd., Yokohama, Japan

[21] Appl. No.: 09/219,370

[22] Filed: Dec. 23, 1998

[30] Foreign Application Priority Data

Dec. 25, 1997 [JP] Japan .................................... 9-358628

[51] Int. Cl.$^6$ ........................................ B60L 11/14
[52] U.S. Cl. ............................ 701/54; 701/90; 701/51; 477/118; 477/62
[58] Field of Search ................... 701/54, 90, 51; 477/118, 62

[56] References Cited

U.S. PATENT DOCUMENTS

| | | | |
|---|---|---|---|
| 4,533,011 | 8/1985 | Heidemeyer et al. | 180/65.2 |
| 5,255,192 | 10/1993 | Ito et al. | 701/90 |
| 5,309,362 | 5/1994 | Ito et al. | 701/90 |
| 5,667,458 | 9/1997 | Narita et al. | 477/169 |
| 5,928,301 | 7/1999 | Soga et al. | 701/51 |

FOREIGN PATENT DOCUMENTS

| | | |
|---|---|---|
| 59-209004 | 11/1984 | Japan . |
| 5-8639 | 1/1993 | Japan . |
| 5-50865 | 3/1993 | Japan . |
| 5-122805 | 5/1993 | Japan . |

*Primary Examiner*—William A. Cuchlinski, Jr.
*Assistant Examiner*—Olga Hernandez
*Attorney, Agent, or Firm*—Foley & Lardner

[57] ABSTRACT

An engine and generator/motor are connected to the input shaft of a continuously variable transmission, and the output shaft of the continuously variable transmission is connected to drive wheels. A target value of a coasting torque acting on the output shaft during coasting is set according to a vehicle speed. A real coasting torque is estimated from the output torque of the engine and frictional torque of the continuously variable transmission. By making the generator/motor function as a generator or a motor, fluctuation of the engine braking force due to a variation of drive ratio during coasting is suppressed so that the real coasting torque coincides with the target value.

9 Claims, 10 Drawing Sheets

22 ELECTROMAGNETIC POWDER CLUTCH
52 STEP MOTOR
53 SPEED CONTROL VALVE
65 ENGINE ROTATION SPEED SENSOR
66 INPUT SHAFT ROTATION SPEED SENSOR
67 OUTPUT SHAFT ROTATION SPEED SENSOR
72 MOTOR/GENERATOR DRIVE CIRCUIT

1  ENGINE
1A STARTER MOTOR
5  AIR CONDITIONER
10 MOTOR/GENERATOR
26 MOTOR/GENERATOR
27 TURBINE ROTOR
28 STATOR
50 ELECTRIC MOTOR
51 HYDRAULIC PUMP
60 CASING

6,009,365

VEHICLE DRIVE SYSTEM CONTROLLER AND CONTROL METHOD

FIELD OF THE INVENTION

This invention relates to torque control during coasting of a vehicle wherein an engine and a motor/generator are connected to driving wheels via a continuously variable transmission.

BACKGROUND OF THE INVENTION

A hybrid vehicle drive system as disclosed by U.S. Pat. No. 4,533,011 rotates drive wheels under an output torque of either or both an engine and a motor/generator according to the running conditions.

When a continuously variable transmission is used with such a drive system, when an accelerator pedal is released while the vehicle is running at high speed, a drive ratio of the transmission varies when the vehicle begins coasting.

Herein, the drive ratio is the ratio of the rotation speed of an input shaft and output shaft of the transmission.

When the vehicle starts coasting, there is an upshift to a minimum drive ratio, then the continuously variable transmission shifts down while the engine rotation speed remains constant due to the decrease of vehicle speed, and after the drive ratio reaches the maximum drive ratio, this maximum drive ratio is maintained until the vehicle stops.

However, during an upshift, the engine brake power decreases, and during a downshift, the engine brake force increases. Therefore, it is impossible to achieve a stable engine braking force during this alternating pattern of upshift and downshift.

SUMMARY OF THE INVENTION

It is therefore an object of this invention to suppress fluctuation of engine braking force during coasting in a vehicle comprising a hybrid drive system and a continuously variable transmission.

In order to achieve the above objects, this invention provides a controller for a vehicle drive system in which an engine and either one of a generator and motor are connected to a drive wheel via a continuously variable transmission. The controller comprises a sensor for detecting a running state of the vehicle including a brake pedal depression and vehicle speed, and a microprocessor programmed to determine whether or not the vehicle is coasting from the running state, set a target value of a rotation torque exerted on the drive wheel during coasting, calculate a real torque exerted on the drive wheel during coasting based on the running state, and control the either one of the generator and motor so that the real torque coincides with the target torque.

This invention also provides a control method for a vehicle drive system in which an engine and either one of a generator and motor are connected to a drive wheel via a continuously variable transmission. The method comprises the steps of detecting a running state of the vehicle, determining whether or not the vehicle is coasting from the running state, setting a target value of a rotation torque of the drive wheel during coasting, calculating a real rotation torque of the drive wheel during coasting based on the running state, and controlling the either one of the generator and motor so that the real torque coincides with the target torque The details as well as other features and advantages of this invention are set forth in the remainder of the specification and are shown in the accompanying drawings.

DESCRIPTION OF THE PREFERRED EMBODIMENTS

Figure 1:
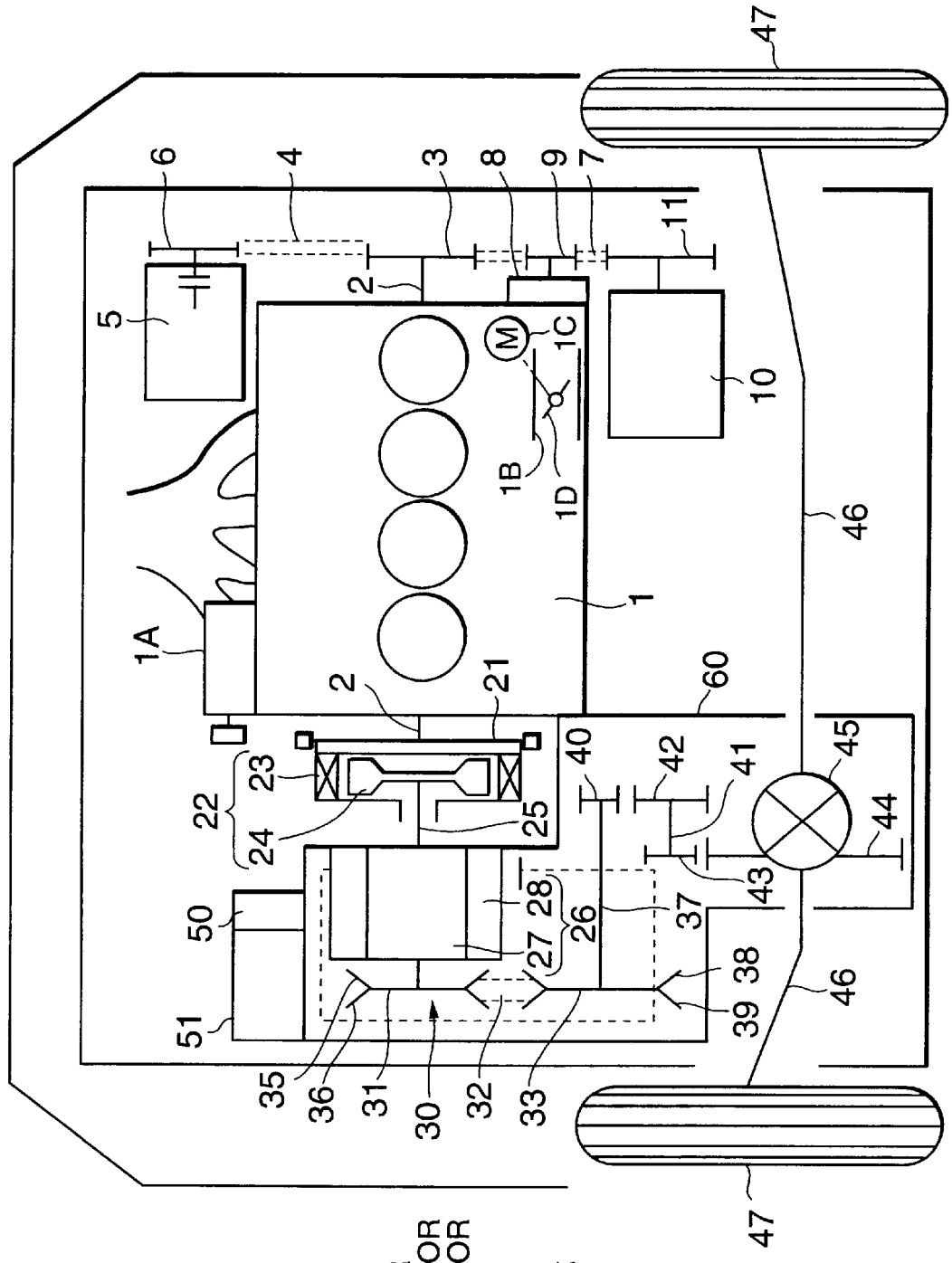
FIG. 1 is a schematic diagram of a vehicle drive system to which this invention is applied.

Referring to FIG. 1 of the drawings, a vehicle applying this invention is provided with a hybrid drive system using a gasoline engine 1 started by a starter motor 1A and two motor/generators 10, 26, and a continuously variable transmission 30.

A crank pulley 3 is connected to one end of a crank axle 2 of the engine 1. The crank pulley 3 drives a pulley 6 of an air conditioner 5 via an auxiliary belt 4. A pulley 9 of a water pump 8 and a pulley 11 of the 3-phase induction motor/generator 10 are driven via different auxiliary belts 7.

The motor/generator 10 drives the air conditioner 5 as an electric motor using electric power from a battery, not shown, when the engine 1 is not running. The motor/generator 10 charges a battery 71 shown in FIG. 2 as a generator when the engine 1 is running, and supplies electric power to auxiliary devices.

A drive member 23 of an electromagnetic powder clutch 22 is connected to the other end of the crank axle 2 of the engine 1 via a flywheel 21. The drive member 23 is an annular member provided with an excitation coil in its interior.

A driven member 24 of the powder clutch 22 is supported free to rotate by a drive shaft 25.

The drive shaft 25 is joined to a turbine rotor 27 of a 3-phase induction motor/generator 26. The motor/generator 26 also comprises a stator 28 having plural magnetic poles with coil windings. The stator is fixed so as to surround the turbine rotor 27.

The drive shaft 25 is connected to the V-belt continuously variable transmission 30.

The continuously variable transmission 30 is provided with a primary pulley 31 joined to an end of the drive shaft 25, and a secondary pulley 33 joined to the primary pulley 31 via a V-belt 32.

The primary pulley 31 comprises a fixed wheel 35 and mobile wheel 36, these wheels forming a V-shaped pulley groove around which the V-belt is looped. The width of the pulley groove is varied by displacement of the mobile wheel 36 in the axial direction according to an oil pressure.

The secondary pulley 33 is similarly provided with a fixed wheel 38 and mobile wheel 39.

A drive gear 40 is joined to the rotation axis 37 of the fixed wheel 38. The drive gear 40 is supported free to rotate via an idler shaft 41 so as to engage with an idler gear 42, and a pinion 43 fixed on the idler shaft 41 engages with a final gear 44. The final gear 44 drives a drive wheel 47 via a differential gear unit 45 and drive shaft 46.

The motor/generator 26 and continuously variable transmission 30 are housed in a casing 60 together with a gear group from the drive gear 40 to the final gear 44.

A hydraulic pump 51 rotated by an electric motor 50 is provided outside the casing 60. The oil pressure generated by the hydraulic pump 51 is supplied to the continuously variable transmission 30 as drive oil pressure of the movable wheel 36 of the primary pulley 31 and the movable wheel 39 of the secondary pulley 33, via a speed control valve 53. The speed control valve 53 is controlled via a step motor 52. The hydraulic pump 51 also supplies lubricating oil to the mechanisms in the casing 60.

Figure 2:
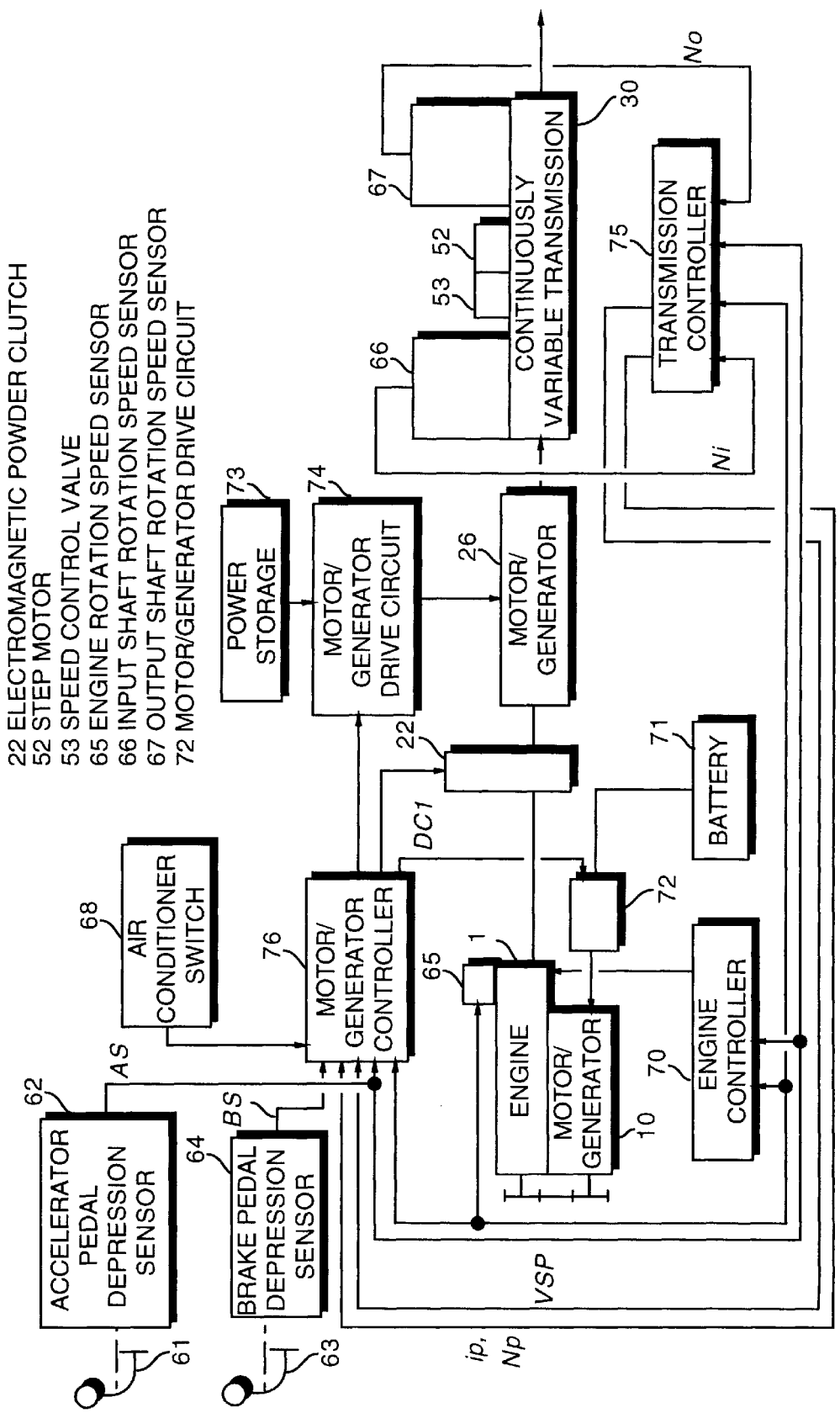
FIG. 2 is a block diagram showing the construction of a drive system controller according to this invention.

Referring to FIG. 2 of the drawings, the motor/generator 26, engine 1 and continuously variable transmission 30 are controlled respectively by a motor/generator controller 76, engine controller 70 and transmission controller 75. These controllers respectively comprise microcomputers comprising a central processing unit (CPU), read-only memory (RAM), random-access memory (ROM) and input-output interface (I/O interface).

This vehicle is provided with an accelerator pedal 61 and brake pedal 63 as shown in FIG. 2.

The accelerator pedal 61 is provided with an accelerator pedal depression sensor 62 which detects a depression amount of the accelerator pedal 61 and outputs a corresponding signal as to the aforesaid three controllers.

A brake pedal 63 is provided with a brake pedal depression sensor 64 which detects a depression amount of the brake pedal 63 and outputs a corresponding signal BS to the motor/generator controller 76.

The engine 1 is provided with an engine rotation speed sensor 65 which detects an engine rotation speed and outputs a corresponding signal Ne to the aforesaid three controllers.

The continuously variable transmission 30 is provided with an input shaft rotation speed sensor 66 which detects the rotation speed of the primary pulley 31 and an output shaft rotation speed sensor 67 which detects the rotation speed of the secondary pulley 33.

The input shaft rotation speed and output shaft rotation speed detected by these rotation speed sensors 66, 67 are input as signals Ni and No to the transmission controller 75.

The engine 1 is provided with an electronic throttle 1D which drives a step motor 1C to increase or decrease the air intake amount of the intake passage 1B, as shown in FIG. 1.

The engine controller 70 controls the throttle opening of the electronic throttle 1D by a signal output so as to vary the output torque of the engine 1.

The motor/generator 10 for driving the air conditioner 5 is connected with a battery 71 via a motor/generator drive circuit 72 as shown in FIG. 2. The motor/generator drive circuit 72 comprises a chopper and an inverter so as to maintain the motor/generator 10 in either a motor or generator state according to a signal from the motor/generator controller 76. The voltage of the battery 71 is 12V. When the engine 1 is running, the motor/generator 10 always functions as generator.

To perform the above control, a signal which indicates the operating state of the air conditioner 5 is input from an air conditioner switch 68 of the air conditioner 5 to the motor/generator controller 76.

The motor/generator 26 is connected to a power storage device 73 via a motor/generator drive circuit 74. The motor/generator drive circuit 74 comprises a chopper and an inverter so as to maintain the motor/generator 26 in either a motor or generator state according to a signal from the motor/generator controller 76. The power storage device 73 is provided with a battery and a capacitor which can be charged to 345V.

The transmission controller 75 controls the drive ratio of the continuously variable transmission 30 by a signal output to the step motor 52.

Figure 3:
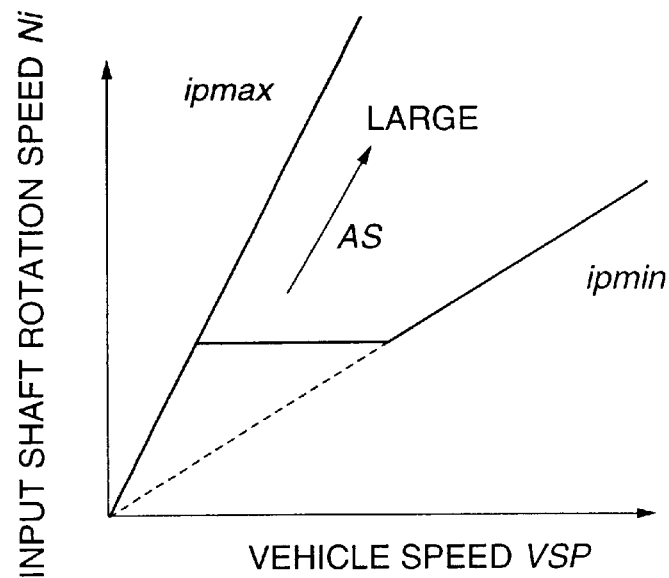
FIG. 3 is a diagram describing the contents of a map of a target drive ratio stored by the controller.

The transmission controller 75 computes a vehicle speed VSP from an output shaft rotation speed No detected by the output shaft rotation sensor 67, and sets a target drive ratio by looking up a pattern control map shown in FIG. 3 based on an input shaft rotation speed Ni detected by the input shaft rotation speed sensor 66, the accelerator pedal depression amount AS detected by the accelerator depression amount sensor 62, and the vehicle speed VSP.

A real drive ratio ip is computed based on the input shaft rotation speed Ni and output shaft rotation speed No, and the step motor 52 is feedback controlled so that the real drive ratio ip coincides with the target drive ratio.

A speed control valve 53 driven by the step motor 52 varies the oil pressure applied to the movable wheels 36, 39 of the continuously variable transmission 30, and contact radii between the V-belt and the pulleys 31, 33 are varied. In this way, the drive ratio of the continuously variable transmission 30 is varied.

The motor/generator controller 76 controls the motor/generator drive circuits 72, 74 and the electromagnetic powder clutch 22 based on the accelerator pedal depression amount AS, brake depression amount BS, real drive ratio ip computed by the transmission controller 75, vehicle speed VSP, engine rotation speed Ne and throttle opening TVO set by the engine controller 70. A command signal which commands start/stop of the engine 1 is also output from the motor/generator controller 76 to the engine controller 70.

Figure 4A:
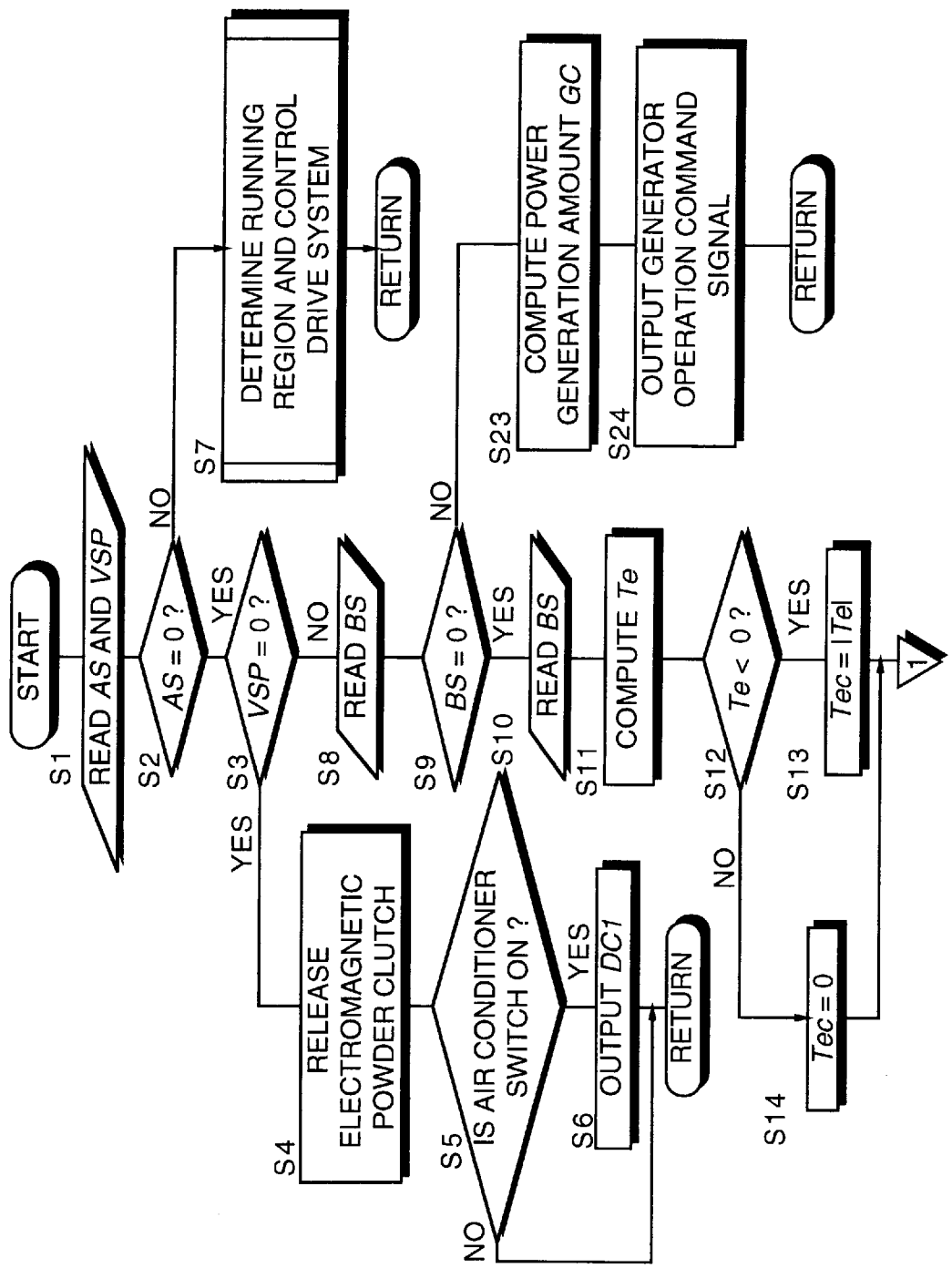
FIGS. 4A and 4B are a flowchart for describing a control process of a motor/generator according to this invention.
Figure 4B:
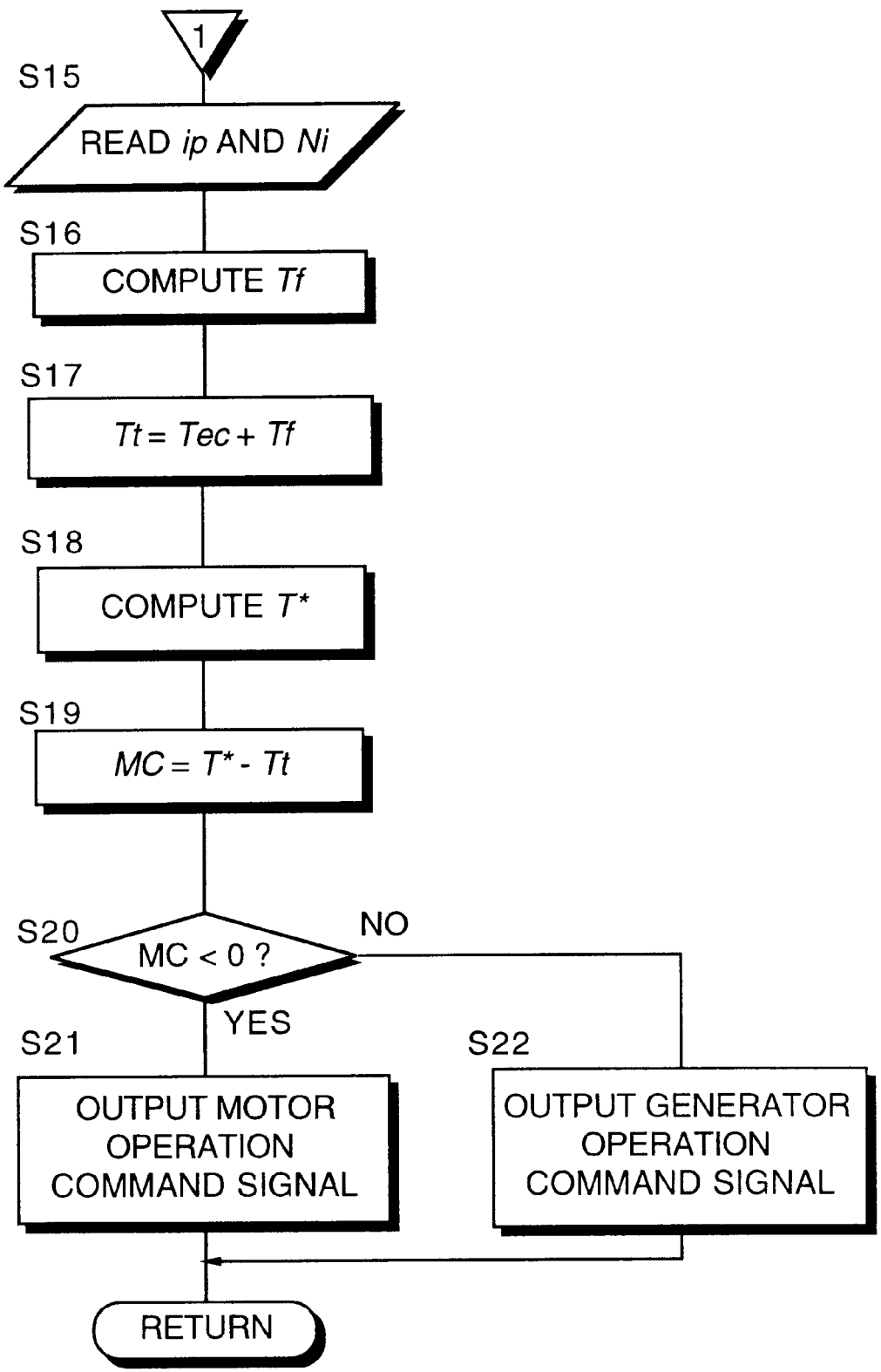

Next, the aforesaid processing performed by the motor/generator controller 76 will be described in detail referring to the flowcharts of FIGS. 4A, 4B. This process is for example performed with a timer interrupt of, for example, 10 milliseconds.

First, the vehicle speed VSP and accelerator pedal depression amount AS are read in a step S1. In a step S2, it is determined whether or not the accelerator pedal depression amount AS is 0, i.e. whether or not the accelerator pedal 61 is released. When AS=0, in a step S3, it is determined that the vehicle speed VSP is 0, i.e. that the vehicle has stopped. If VSP=0, the routine proceeds to a step S4.

In the step S4, the electromagnetic powder clutch 22 is released by, for example, outputting a clutch control signal CL with a logic value=0 to the electromagnetic powder clutch 22.

In a step S5, it is determined whether or not the air conditioner switch 68 is ON, and when it is OFF, the process is terminated without performing the subsequent steps.

When the air conditioner switch 68 is ON, a high level drive control signal DC1 which drives the motor/generator 10 as a motor is output to the motor/generator drive circuit 72 in a step S6, and the process is terminated.

In the step S2, when the accelerator pedal depression amount AS is not zero, the accelerator pedal 61 is depressed. In this case, the routine proceeds from the step S2 to a step S7.

Figure 5:
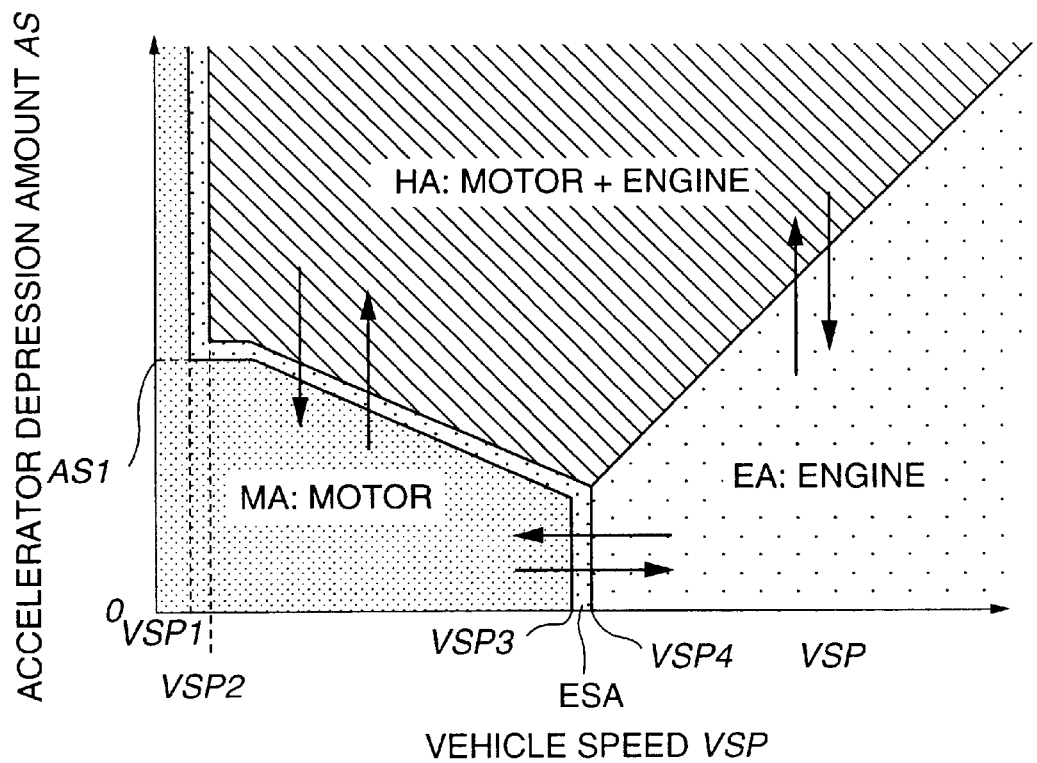
FIG. 5 is a diagram describing the contents of a map of a running pattern stored by the controller.

In the step S7, based on the vehicle speed VSP and accelerator pedal depression amount AS, it is determined which of the following four regions the vehicle running state corresponds to by referring to a running pattern control map shown in FIG. 5.

A motor running region MA is a region where the vehicle runs only under the output of the generator/motor 26.

An engine running region EA is a region where the vehicle runs only under the output of the engine 1.

A hybrid running region HA is a region where the vehicle usually runs only under the output of the engine 1, but uses the motor/generator 26 during acceleration.

An engine starting region ESA is a region which exists at the boundary between the motor running region MA, and the surrounding regions EA, HA, and it starts the engine 1.

These regions are preset according to the vehicle speed VSP and accelerator pedal depression amount AS as shown in FIG. 5, and are stored as a map by the motor/generator controller 76.

Next, the engine 1, motor/generator 26 and electromagnetic powder clutch 22 are controlled according to the determined running region, and the process is terminated. The processing of the step S7 is executed as a subroutine. In this subroutine, the electromagnetic powder clutch 22 is engaged or released according to the conditions.

Specifically, when the running state shifts from the motor running region MA to the engine start region ESA and the engine 1 starts, the electromagnetic powder clutch 22 is engaged when the engine rotation speed Ne is equal to the input shaft rotation speed Ni of the continuously variable transmission 30, i.e. the rotation speed of the motor/generator 26. On the other hand, when the engine running state shifts from the engine running region EA or hybrid running region HA to the motor running region MA, the electromagnetic powder clutch 22 is released when the accelerator pedal depression amount AS exceeds a predetermined value or the vehicle stops.

In this subroutine, even when the running state is the motor running region MA, when the charge amount of the power storage device 73 is low, the engine 1 starts, and the motor/generator 26 is operated as a generator so as to charge the power storage device 73.

In the step S3, when the vehicle speed VSP is not zero, the routine proceeds to a step S8. Here, the brake pedal depression amount BS is read, and it is determined whether or not the brake pedal depression amount BS is zero in a step S9.

In this determination, it is determined whether the vehicle is in a coasting state or a braking state.

When the brake pedal depression amount BS is zero, the vehicle is in the coasting state.

In this case, the engine rotation speed Ne and throttle opening TVO are read in a step S10.

Figure 6:
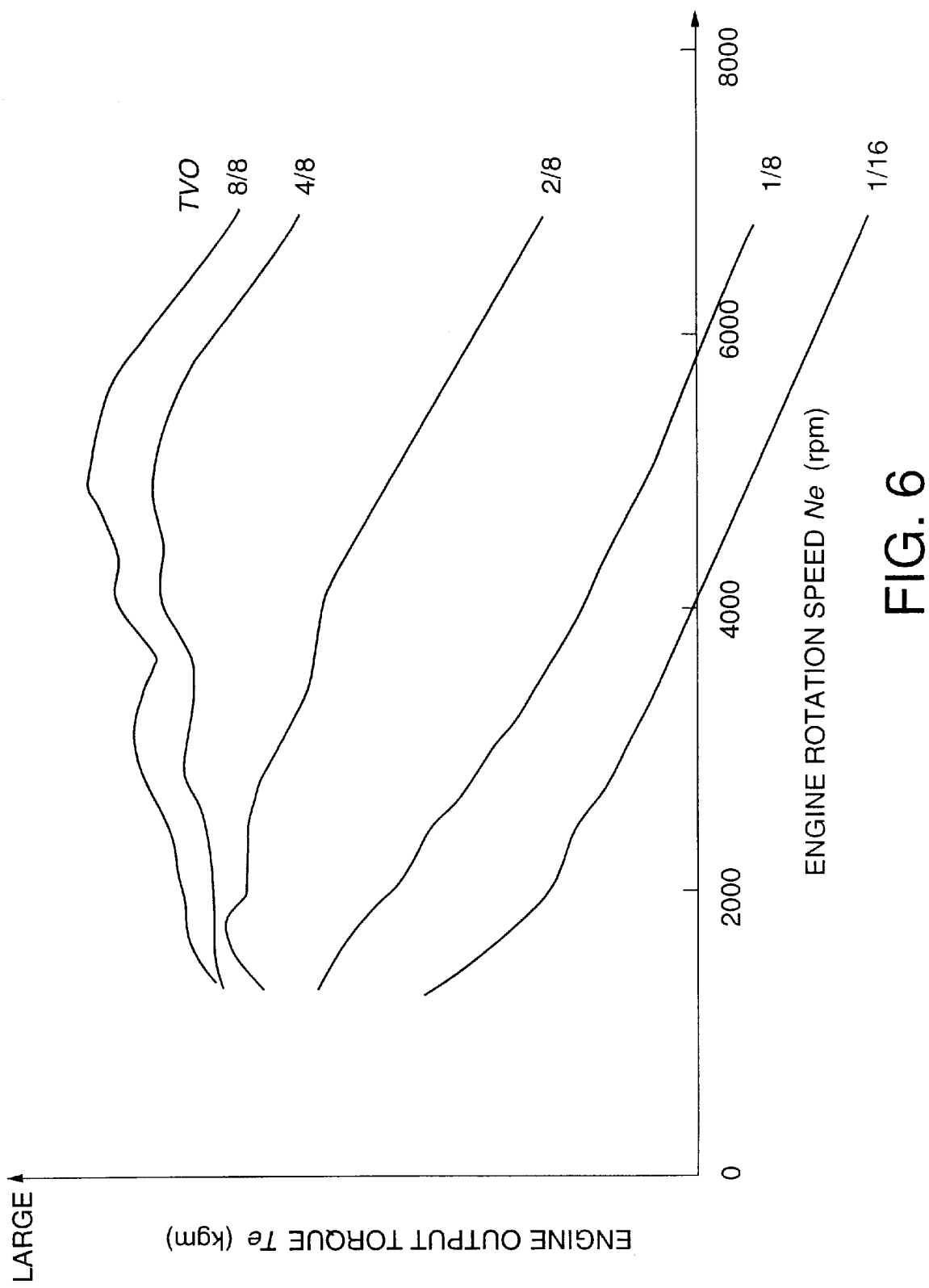
FIG. 6 is a diagram describing the contents of an engine output torque computing map stored by the controller.

Subsequently, in a step S11, based on these conditions, an engine output torque Te is computed by looking up an engine output torque computing map shown in FIG. 6.

In the next step S12, it is determined whether or not the engine output torque Te is negative.

When the engine output torque Te>0, an absolute value of the engine output torque Te is set as an engine coasting torque Tec in a step S13, and the routine proceeds to a step S15.

When Te≧0, the routine proceeds to a step S14, the engine coasting torque Tec is set to zero and the routine proceeds to the step S15.

In the step S15, the drive ratio ip of the continuously variable transmission 30 output from the transmission controller 75 and the input shaft rotation speed Ni are read.

Figure 7:
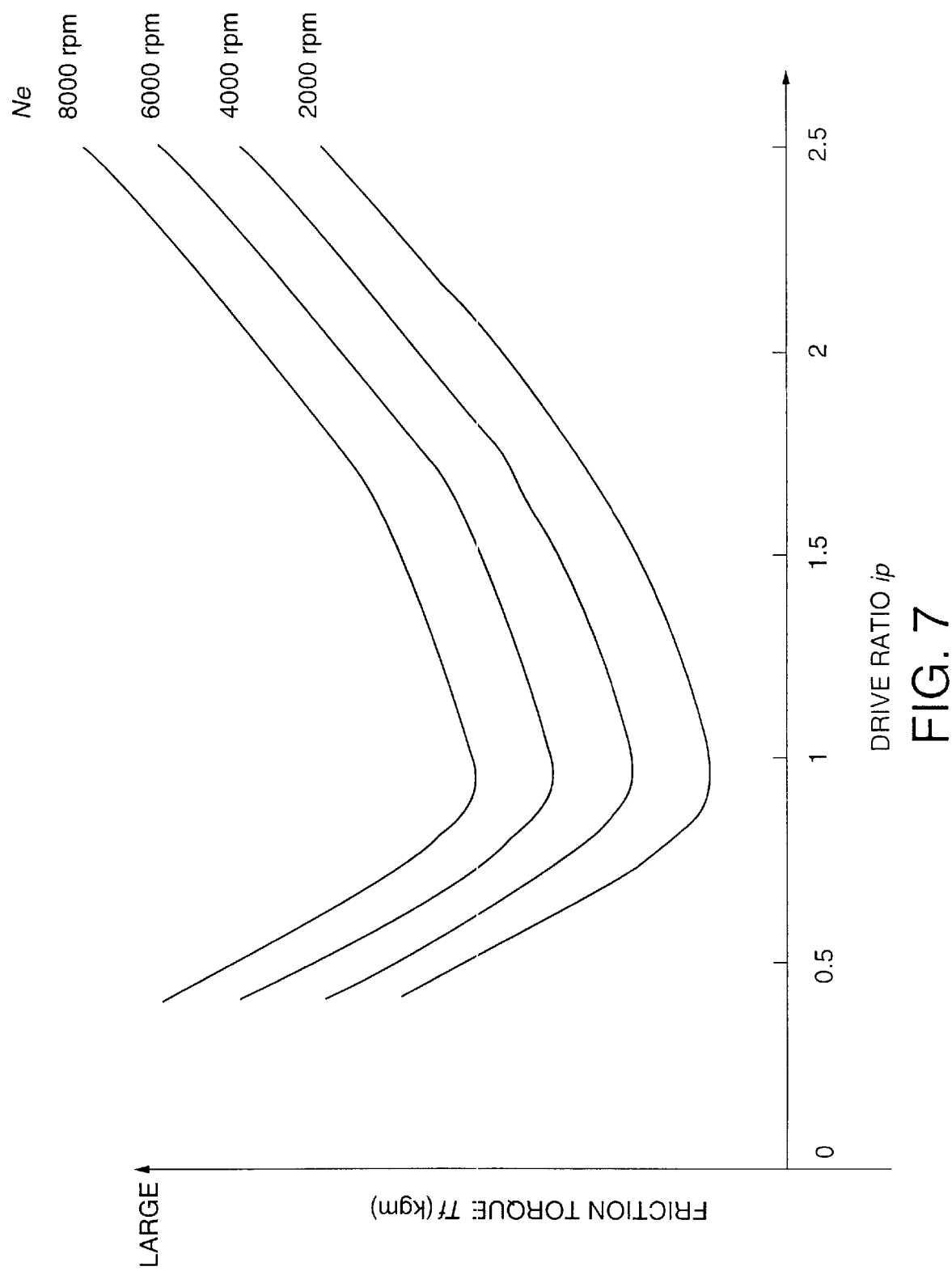
FIG. 7 is a diagram describing the contents of a transmission friction torque computing map stored by the controller.

In a step S16, a transmission friction torque Tf is computed by looking up a transmission friction torque computing map shown in FIG. 7 based on the real drive ratio ip and input shaft rotation speed Ni.

In a step S17, the engine coast torque Tec and transmission friction torque Tf are added to compute the total coasting torque Tt.

The total coasting torque Tt corresponds to the output shaft rotation torque of the continuously variable transmission 30 during coasting.

Figure 8:
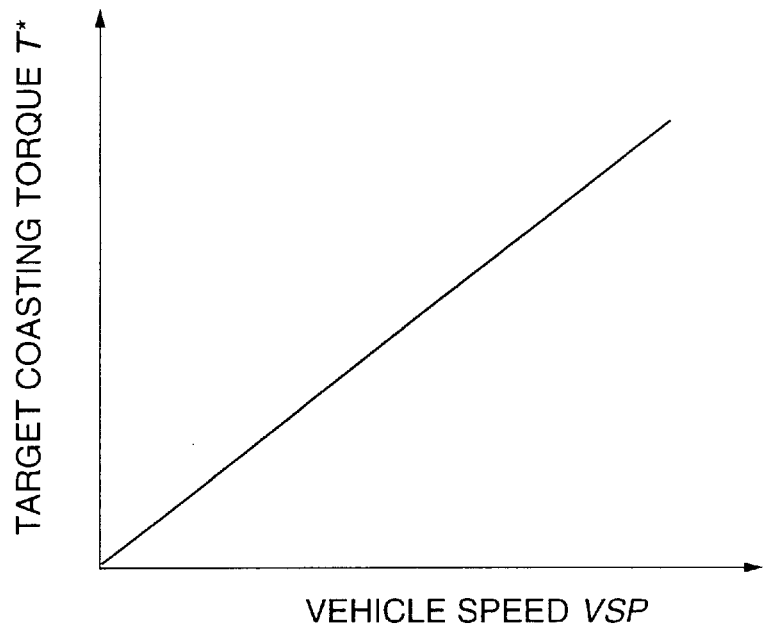
FIG. 8 is a diagram describing the contents a target coast torque computing map stored by the controller.

A target coasting torque T* is computed by looking up a target coast torque computing map shown in FIG. 8, based on the vehicle speed VSP, in a step S18.

In a step S19, the total coasting torque Tt is subtracted from the target coast torque T* to calculate a deviation MC.

In a step S20, it is determined whether or not the deviation MC is negative.

When the deviation MC is negative, it means that the total coasting torque Tt is larger than the target coasting torque T*. In this case, in a step S21, a motor operation command signal according to the deviation MC is output to the motor/generator drive circuit 74. Due to this, the motor/generator 26 operates as a motor, and an engine brake increase amount is offset by the output torque of the motor.

After having controlled the total coasting torque Tt to the target coasting torque T by this processing, the routine is terminated.

In a step S20, when the deviation MC≧0, it means that the total coasting torque Tt is equal to or less than the target coasting torque T*. In this case, in a step S22, a generator operation command signal according to the deviation MC is output to the motor/generator drive circuit 74. Due to this, the motor/generator 26 functions as a generator, and as the vehicle enters a regenerative braking state wherein the coasting torque is an energy source, an insufficiency of engine braking is compensated.

After the total coasting torque Tt has been controlled to the target coasting torque T by this processing, the routine is terminated.

On the other hand, in a step S9, when the brake pedal depression amount BS is positive, it means that braking is being performed.

In this case, the routine proceeds to a step S23, and a power generation amount GC is computed by looking up an energy recovery amount computing map, not shown, which is preset based on the brake pedal depression amount BS.

Next, in a step S24, a generator actuation command signal according to the power generation amount GC is output to the motor/generator drive circuit 74, and the routine is terminated.

The motor/generator 26 therefore enters a regenerating brake state, engine braking is enhanced, and the power generated by the motor/generator 26 is used to charge the power storage device 73.

In this way, when the vehicle is coasting, a target coasting torque T* is set, and when there is an insufficiency or excess of the total coasting torque Tt relative to the target coast torque T*, torque insufficiencies or excesses are compensated by making the motor/generator 26 function as a generator or a motor. As a result, an engine braking which suits the vehicle speed VSP is realized.

Figure 12:
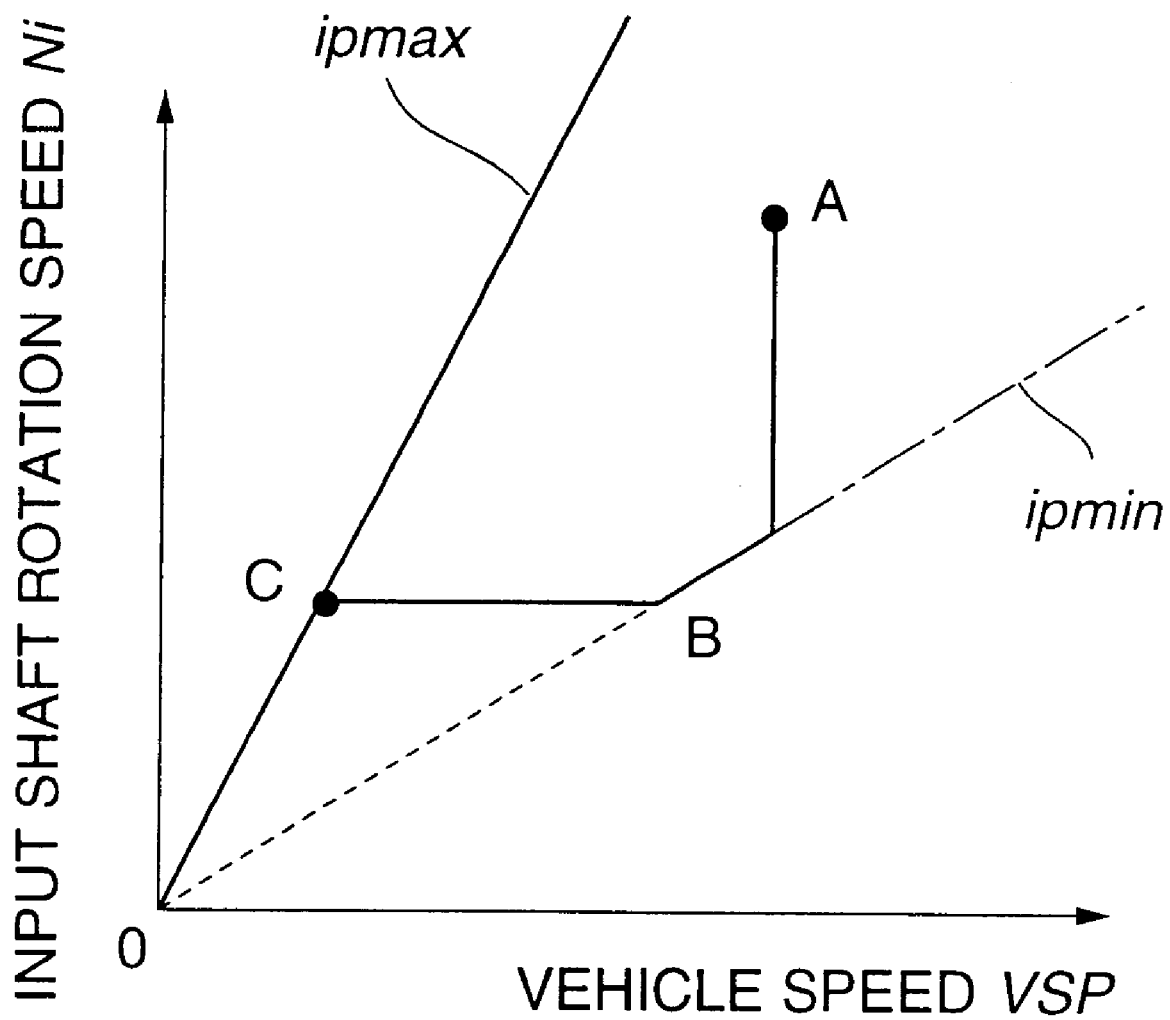
FIG. 12 is a diagram describing a change of drive ratio of the continuously variable transmission during coasting of a vehicle.

For example, consider the case when the vehicle is traveling in the engine running region EA or hybrid running region HA, and the vehicle speed VSP, input/output shaft rotation speed Ni of the continuously variable transmission 30 and drive ratio ip are as shown by the point A in FIG. 12.

When the accelerator pedal 61 is released at this point A so that the vehicle starts coasting, the drive ratio of the continuously variable transmission 30 varies as follows.

At first, the vehicle speed VSP hardly varies relative to the decreasing input shaft rotation speed Ni, and the drive ratio varies to a minimum drive ratio ipmin. Subsequently, the vehicle speed VSP and input shaft rotation speed Ni drop to a point B corresponding to an idle rotation speed of the engine 1 under the minimum drive ratio ipmin.

Subsequently, the vehicle speed VSP is decreased as the continuously variable transmission 30 shifts down until the drive ratio reaches a point C of a maximum drive ratio ipmax while the input shaft rotation speed remains constant, and after the point C, the maximum drive ratio ipmax is maintained until the vehicle stops.

Figure 9:
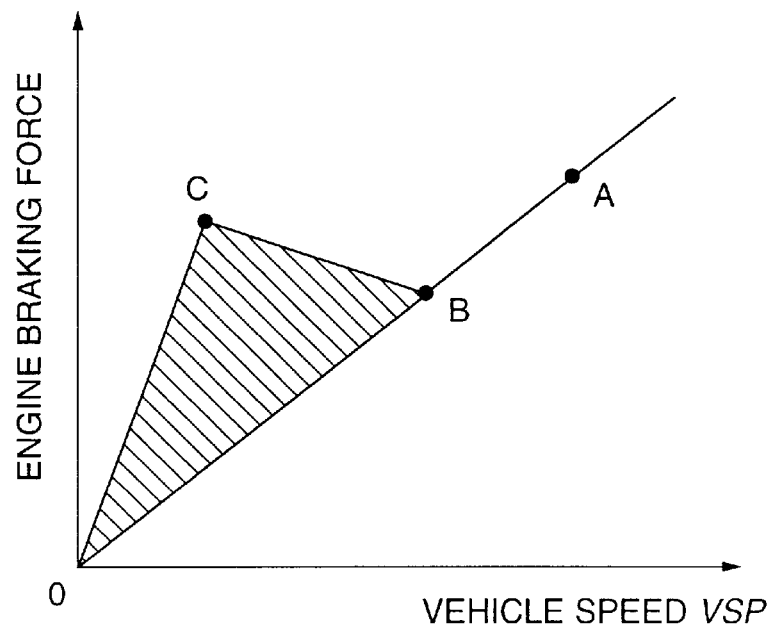
FIG. 9 is a diagram describing a change of engine brake power during coasting according to a conventional control method.

When the continuously variable transmission is used with the hybrid vehicle drive system of the aforesaid prior art, the engine braking force varies as shown in FIG. 9 with the aforesaid change of drive ratio, i.e. from the point A to the point B, the engine braking power falls according to drop of the vehicle speed VSP. However, during the downshift from the point B to the point C, as the torque transmitted to the engine from the drive wheels varies with the change of drive ratio, the engine braking force increases although the vehicle speed VSP is decreasing. Then, after the point C at which the drive ratio becomes constant at the maximum drive ratio ipmax, the engine braking force again falls together with the vehicle speed VSP.

It is desirable that, during coasting, the engine braking force also drops as the vehicle speed VSP decreases. However, in the aforesaid combination of the hybrid drive system and the continuously variable transmission, the engine braking force also fluctuates together with changes of drive ratio during coasting.

In the drive system controller according to this invention, when there are torque excesses and deficiencies relative to the target torque T* during coasting, the motor/generator 26 is made to function either as a generator or a motor so that these torque excesses and deficiencies are compensated.

For example, in the shaded region of FIG. 9, engine braking force is suppressed because the motor/generator 26 functions as a motor.

Conversely, when the total coasting torque Tf relative to target coasting torque T* is small, the resistance to engine rotation is increased and engine braking force is increased because the motor/generator 26 functions as a generator.

Therefore, engine braking force is made to correspond to the vehicle speed VSP regardless of the change of drive ratio.

In this controller, the target coasting torque T* is found from the target coasting torque computing map of FIG. 8, but it is also possible to allow the driver to select the target coasting torque computing map from among a plurality of candidate maps.

Alternatively, a computational equation may be stored in the controller 76 instead of storing the target coasting torque computing map, and the controller 12 may compute the target coasting torque T* by substituting the vehicle speed VSP in the computational equation.

Next, a second embodiment of this invention will be described referring to FIGS. 10 and 11.

According to this embodiment, the invention is applied to a continuously variable transmission comprising a manual speed change mode similar to that of a manual transmission. The continuously variable transmission is provided with six drive ratios ip1–ip6 that a driver can select.

In the manual speed change mode, the driver commands a downshift or upshift by operating a selector lever, not shown.

Figure 10:
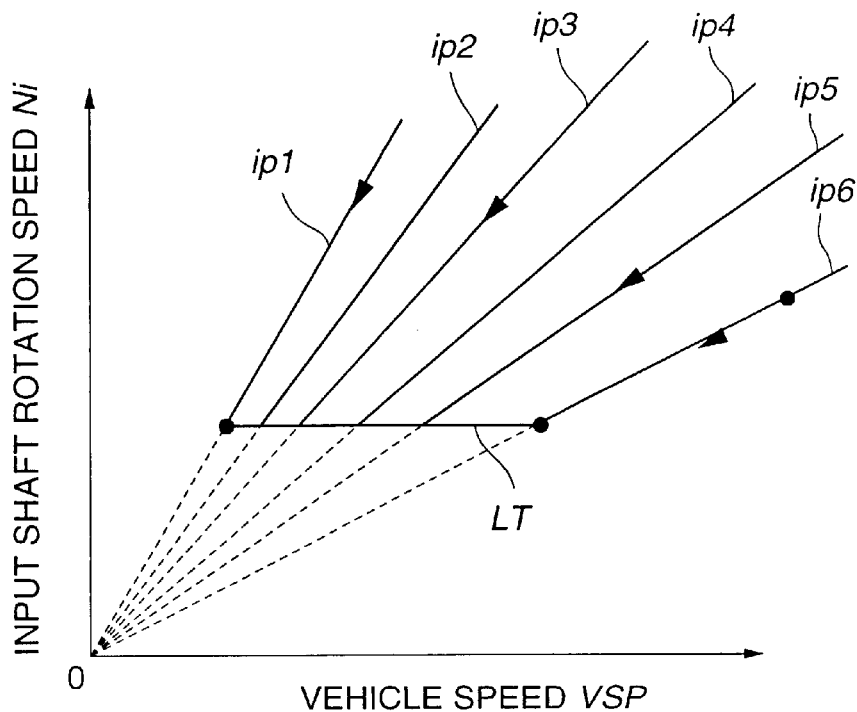
FIG. 10 is a diagram of a speed change pattern for describing a second embodiment of this invention related to application of this invention to a quasi-manual speed change mode of the continuously variable transmission.
Figure 11:
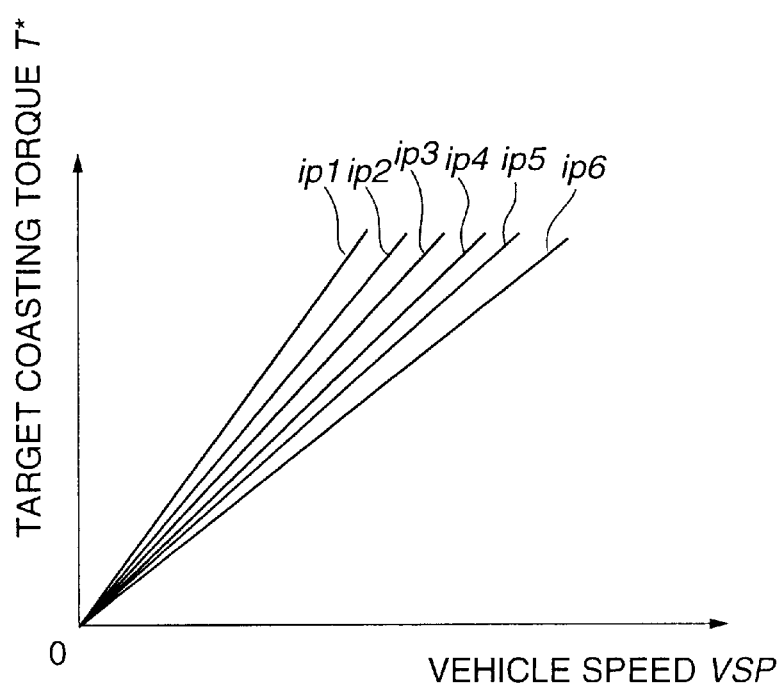
FIG. 11 is a diagram describing the contents of a target coast torque computing map stored by the controller according to the second embodiment.

However, when the vehicle speed VSP becomes less than or equal to a predetermined vehicle speed VSPM, the drive ratio is forcibly changed to the maximum drive ratio regardless of the drive ratio designated by the driver, and varies the drive ratio as shown by the line LT to the maximum drive ratio ip1 shown in FIG. 10 while the engine rotation speed is maintained constant.

In this embodiment, the motor/generator controller 76 stores the target coasting torque computing map for each drive ratio. The target coasting torque T* is computed using the map corresponding to the designated drive ratio. The contents of these maps are summarized in FIG. 11.

The above embodiments are related to a V-belt continuously variable transmission, however this invention may be applied also to a drive system for a vehicle fitted with other kinds of continuously variable transmissions, such as a toroidal continuously variable transmission.

In the above embodiments the motor/generator 26 was used, but the invention may be applied also to a drive device comprising a separate generator and motor.

Further, either excess or insufficiency of engine braking power can be compensated even when this invention is applied to a drive system comprising an engine combined with only either of a generator and a motor.

The motor/generator 26 may be connected to the output shaft of the continuously variable transmission 30 instead of being connected to the input shaft of the continuously variable transmission 30. Further, the motor/generator 26 may be connected to the input shaft or output shaft via rotating transmission members such as gears or belts instead of being joined to the input shaft or output shaft directly.

The corresponding structures, materials, acts, and equivalents of all step plus function elements in the claims below are intended to include any structure, material, or acts for performing the functions in combination with other claimed elements as specifically claimed. The embodiments of this invention in which an exclusive property or privilege is claimed are defined as follows:

What is claimed:

1. A control method for a vehicle drive system in which an engine and either one of a generator and motor are connected to a drive wheel via a continuously variable transmission, comprising the steps of:

detecting a running state of said vehicle, determining whether or not the vehicle is coasting from said running state, setting a target value of a rotation torque of said drive wheel during coasting, calculating a real rotation torque of said drive wheel during coasting based on said running state, and controlling said either one of said generator and motor so that said real torque coincides with said target torque.

2. A controller for a vehicle drive system in which an engine and either one of a generator and motor are connected to a drive wheel via a continuously variable transmission, comprising:

a sensor for detecting a running state of said vehicle, and a microprocessor programmed to:

determine whether or not the vehicle is coasting from said running state, set a target value of a rotation torque exerted on said drive wheel during coasting, calculate a real torque exerted on said drive wheel during coasting based on said running state, and control said either one of said generator and motor so that said real torque coincides with said target torque.

3. A controller as defined in claim 1, wherein said sensor comprises a sensor for detecting a running speed of said vehicle, and said microprocessor is further programmed to set said target value based on said running speed.

4. A controller as defined in claim 1, wherein said vehicle drive system comprises a generator and a motor, and said microprocessor is further programmed to control said generator and said motor so that said motor applies a rotation torque to said drive wheel when said real torque is greater than said target torque, and said drive wheel applies a rotation torque to said generator when said real torque is less than said target torque value.

5. A controller as defined in claim 4, wherein said generator and said motor comprise a single generator/motor permanently connected to said drive wheels which functions as a motor when power is supplied from outside, and functions as a generator when a rotation torque Is supplied from outside, comprise an electrical circuit for changing over between the generator function and motor function of said generator/motor, and said microprocessor is further programmed to perform control of said generator/motor via said electrical circuit.

6. A controller as defined in claim 1, wherein said continuously variable transmission comprises an input shaft and output shaft, said engine is joined to said input shaft, said either one of said generator and said motor is connected to either one of said input shaft and said output shaft, said output shaft is joined to said drive wheel, said sensor comprises a sensor for detecting a rotation speed of said input shaft and a sensor for detecting a rotation speed of said output shaft, and said microprocessor is further programmed to calculate a frictional torque of said continuously variable transmission based on the rotation speeds of said input shaft and said output shaft, and calculate said real torque based on said frictional torque.

7. A controller as defined in claim 6, wherein said sensor comprises a sensor for detecting a running speed of said vehicle, and said microprocessor is further programmed to calculate a drive ratio of said continuously variable transmission from said rotation speeds of said input shaft and output shaft, and set said target value based on said running speed and said drive ratio.

8. A controller as defined in claim 6, wherein said engine comprises a throttle for increasing or decreasing an intake air amount according to an opening thereof, said sensor further comprises a sensor for detecting the opening of said throttle and a sensor for detecting a rotation speed of said engine, and said microprocessor is further programmed to calculate an output torque of said engine based on said throttle opening and said engine rotation speed, and calculate said real torque based on said frictional torque and said engine output torque.

9. A controller as defined in claim 8, wherein said microprocessor is further programmed to set said engine output torque to zero when said engine output torque is positive, set said engine output torque to an absolute value of said engine output torque when said engine output torque is negative, and calculate said real torque by adding said frictional torque to said set engine output torque.

* * * * *